US009112773B2

(12) United States Patent
Lane et al.

(10) Patent No.: US 9,112,773 B2
(45) Date of Patent: Aug. 18, 2015

(54) COMMUNICATION ASSETS SURVEY AND MAPPING TOOL

(71) Applicants: Rita A. Lane, San Diego, CA (US); Eric Jay Coolbaugh, Encinitas, CA (US); Alice Hoff, San Diego, CA (US); Jeffrey B. Lee, Lakeside, CA (US); Walter M. Seay, Poway, CA (US)

(72) Inventors: Rita A. Lane, San Diego, CA (US); Eric Jay Coolbaugh, Encinitas, CA (US); Alice Hoff, San Diego, CA (US); Jeffrey B. Lee, Lakeside, CA (US); Walter M. Seay, Poway, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 47 days.

(21) Appl. No.: 14/096,931

(22) Filed: Dec. 4, 2013

(65) Prior Publication Data
US 2014/0310400 A1    Oct. 16, 2014

Related U.S. Application Data

(63) Continuation of application No. 13/205,689, filed on Aug. 9, 2011, now Pat. No. 8,656,014, which is a continuation of application No. 12/365,540, filed on Feb. 4, 2009, now Pat. No. 8,024,461, which is a continuation-in-part of application No. 11/452,565, filed on Jun. 5, 2006, now abandoned, and a continuation-in-part of application No. 11/449,178, filed on May 16, 2006, now abandoned.

(51) Int. Cl.
*G06F 15/173* (2006.01)
*H04L 12/26* (2006.01)
*G06Q 10/10* (2012.01)

(52) U.S. Cl.
CPC .............. *H04L 43/06* (2013.01); *G06F 15/173* (2013.01); *G06Q 10/10* (2013.01)

(58) Field of Classification Search
CPC ................................ G06Q 10/10; H04L 43/06
USPC ................................................... 709/223, 224
See application file for complete search history.

(56) References Cited

U.S. PATENT DOCUMENTS

| 5,584,025 A * | 12/1996 | Keithley et al. ................ 707/752 |
| 2005/0034075 A1* | 2/2005 | Riegelman et al. ........... 715/714 |
| 2006/0080344 A1* | 4/2006 | McKibben et al. ........... 707/100 |
| 2010/0114493 A1* | 5/2010 | Vestal ............................... 702/9 |
| 2010/0149335 A1* | 6/2010 | Miller, Ii ....................... 348/148 |
| 2010/0250312 A1* | 9/2010 | Tarabzouni et al. .............. 705/7 |

* cited by examiner

*Primary Examiner* — Mohamed Wasel
(74) *Attorney, Agent, or Firm* — SPAWAR Systems Center Pacific; Kyle Eppele; J. Eric Anderson

(57) ABSTRACT

A method for determining communications interoperability comprising the following steps: (a) collecting communication asset data that describes communication equipment used by emergency and first responders from local, state and federal entities in a geographical region; (b) determining the communications interoperability between the entities based on the collected communication asset data, wherein the communications interoperability describes the ability of the communication equipment used by emergency and first responders of a given entity to be interoperable or not interoperable with the communication equipment used by emergency and first responders in the other entities in the geographic region; and (c) displaying the communications asset data and the communications interoperability of the entities in a geo-spatial referenced map to geographically-disparate users via an internet.

20 Claims, 5 Drawing Sheets

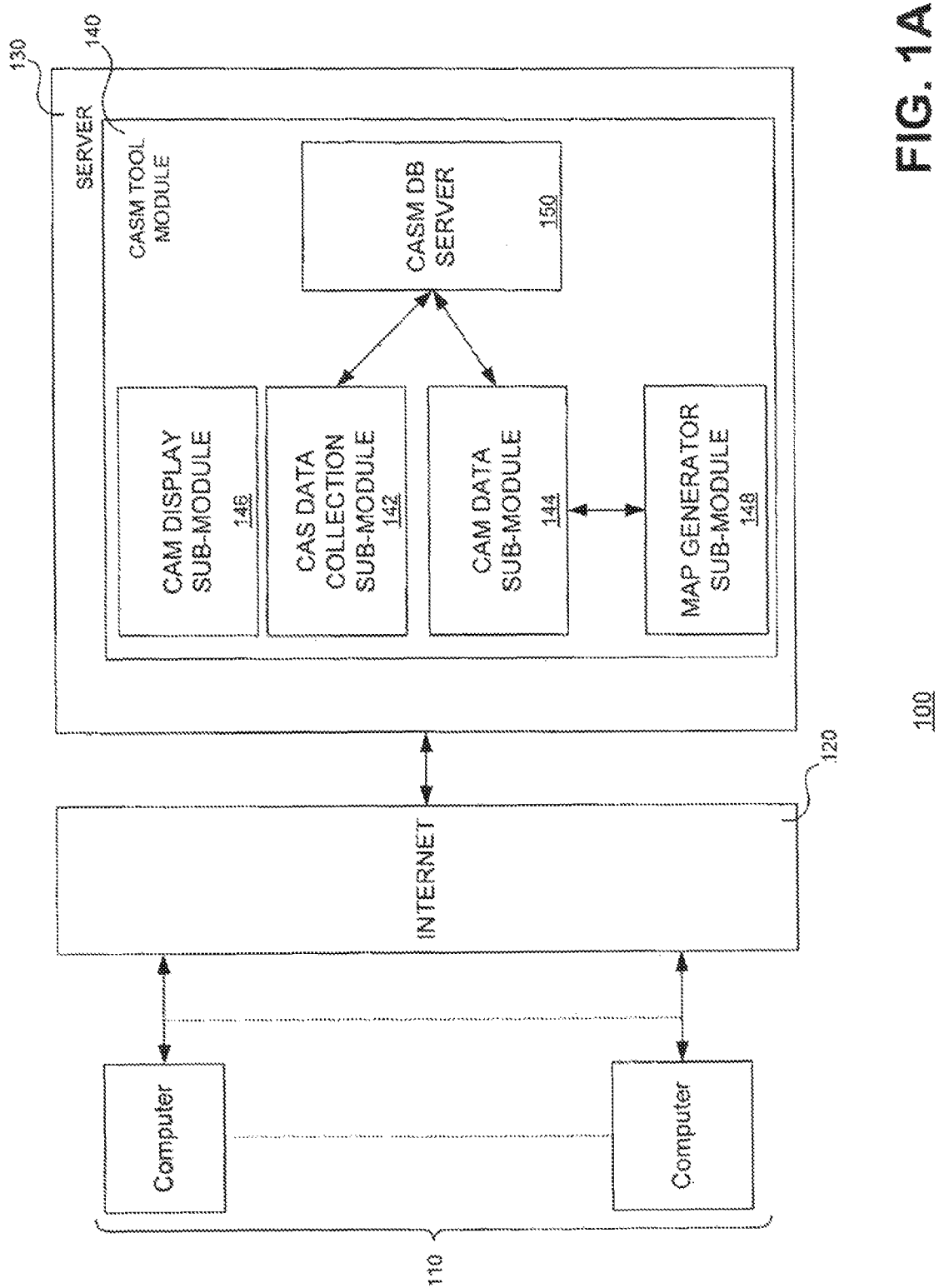

COMMUNICATION ASSETS SURVEY AND MAPPING TOOL

CROSS-REFERENCE TO RELATED APPLICATIONS

This application is a continuation of U.S. application Ser. No. 13/205,689, filed Aug. 9, 2011, U.S. Pat. No. 8,656,014, entitled "Communication Assets Survey and Mapping Tool with Add/Edit Feature"; which is a continuation of U.S. application Ser. No. 12/365,540, filed Feb. 4, 2009, U.S. Pat. No. 8,024,461, issued Sep. 20, 2011, entitled "Communication Assets Survey and Mapping Tool"; which is a continuation-in-part of abandoned U.S. application Ser. No. 11/452,565, filed Jun. 5, 2006, and Ser. No. 11/449,178, filed May 16, 2006, both entitled "Communication Assets Survey and Mapping Tool"; all of which are hereby incorporated by reference herein in their entireties for their teachings, and referred to hereafter as "the parent applications."

FEDERALLY-SPONSORED RESEARCH AND DEVELOPMENT

This invention is assigned to the United State Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_t2@navy.mil. Reference Navy Case Number 102880.

BACKGROUND

The Communication Assets Survey and Mapping Tool is generally in the field of public safety. Frequently, local, state and federal emergency and first responder communication assets are not interoperable. For example, a county fire department may not be able to communicate with a police department of an adjacent county. A need exists for tools to help improve interoperability of emergency and first responder communication assets between local, state and federal entities.

BRIEF DESCRIPTION OF THE DRAWINGS

FIG. 1A is a block diagram of one embodiment of a communication assets survey and mapping tool.

DETAILED DESCRIPTION

Figure 1B:
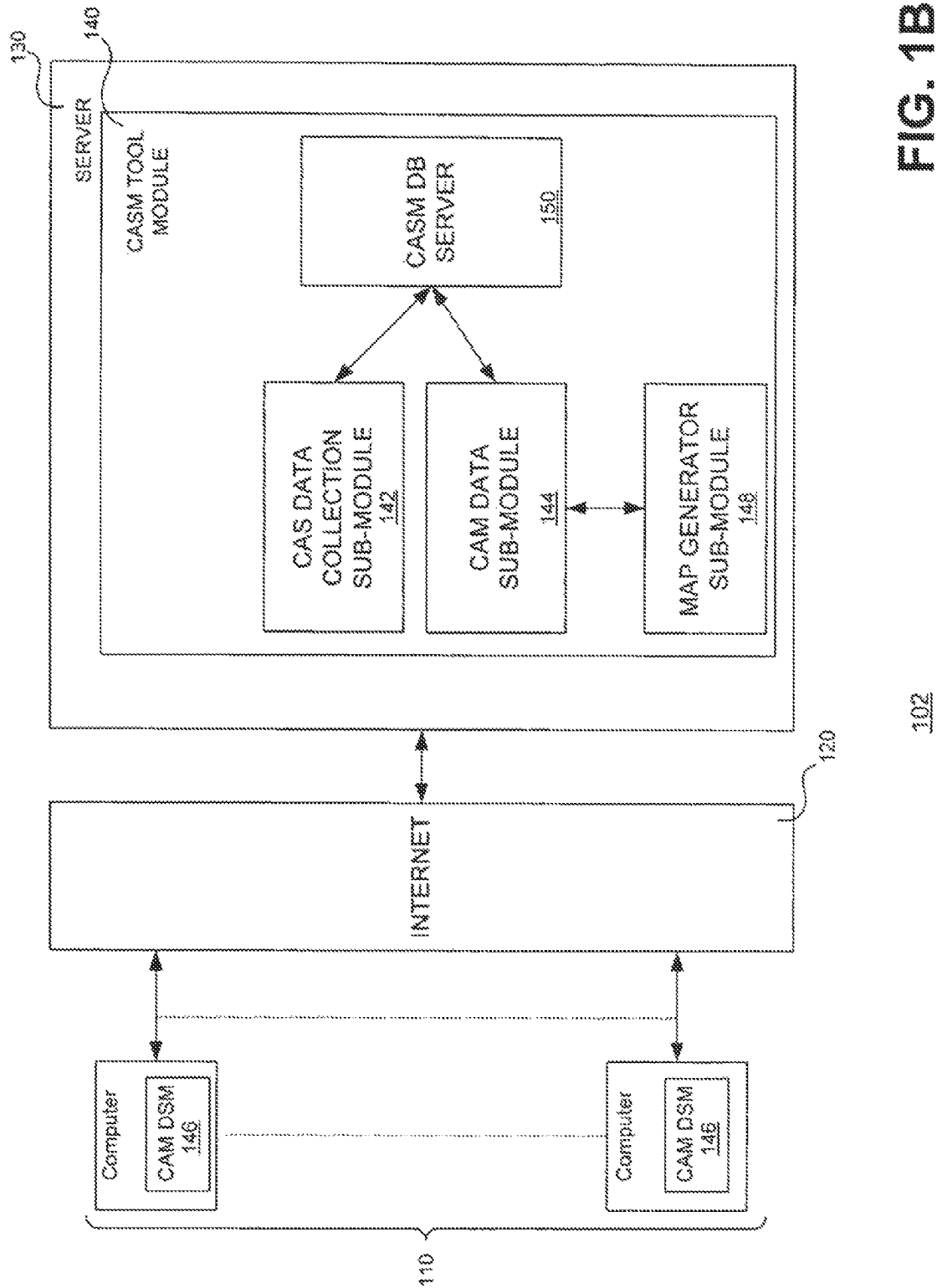
FIG. 1B is a block diagram of one embodiment of a communication assets survey and mapping tool.

Described herein is a Communication Assets Survey and Mapping Tool. The following acronyms are used herein:
CAM—Communication Assets Mapping
CAS—Communication Assets Survey
CASM—Communication Assets Survey and Mapping
DB—Database
DSM—Display Sub-Module
ISP—Internet Service Provider The Communication Assets Survey and Mapping (CASM) Tool includes a CASM Tool Module, which includes a communication assets mapping (CAM) display sub-module, a communication assets survey (CAS) data collection sub-module, a CAM data sub-module, a map generator sub-module and a CASM database (DB) server. The CASM Tool provides a method and apparatus for viewing interoperability of emergency and first responder communication assets between local, state and federal entities. The CASM Tool provides a mechanism for collecting communication assets data, determining interoperability between agencies based on communication assets and providing interoperability data to users. The CASM Tool provides access to geographically disparate users via the Internet and display of communications equipment and information in a geo-spatial referenced map to users via the Internet.

FIG. 1A is a block diagram of one embodiment of a communication assets survey and mapping tool. As shown in FIG. 1A, CASM tool system 100 includes at least one computer 110, internet 120 and system server 130, which hosts CASM tool module 140. CASM tool module 140 includes CAM display sub-module 146, CAS data collection sub-module 142, CAM data sub-module 144, map generator sub-module 148 and CASM DB server 150. As shown in FIG. 1A, at least one computer 110 is operatively coupled to internet 120 so data can be transmitted between at least one computer 110 and internet 120. Internet 120 is operatively coupled to system server 130 so data can be transmitted between internet 120 and system server 130. At least one computer 110 and system server 130 can be operatively coupled to internet 120 in one of many configurations such as connection via an internet service provider (ISP).

As shown in FIG. 1A, CASM tool module 140 includes CAS data collection sub-module 142, CAM data sub-module 144, map generator sub-module 148, CASM DB server 150 and CAM display sub-module 146. CASM tool module 140 is operatively coupled to system server 130.

CAS data collection sub-module 142 is operatively coupled to CASM DB server 150. CAS data collection sub-module 142 includes computer programs capable of collecting communication asset data and interfacing with CASM DB server 150 for storing communication asset data, providing a mechanism for input, validation and viewing of state and urban area communications equipment data and providing forms, reports generation and retrieval/storage of data in CASM DB server 150.

CAM data sub-module 144 is operatively coupled to and provides an interface between CAM Display Sub-Module 146 and CASM DB Server 150. CAM data sub-module 144 includes computer programs capable of providing an interface between CAM display sub-module 146 and CASM DB Server 150 for the storage/retrieval of information regarding data sharing. For example, CAM display sub-module 146 includes an interface for storage/retrieval of Tactical Interoperable Communications Plan and other user files, which allows data sharing between region managers and their users.

Map generator sub-module 148 is operatively coupled to CAM data sub-module 144. Map generator sub-module 148 is capable of generating a customized map image to be shown to a user via CAM display sub-module 146 and at least one computer 110. In one embodiment, map generator sub-module 148 receives input from a user regarding custom map specifications. Map generator sub-module 148 can also generate a customized map image to CAS data collection sub-module 142.

CASM DB server 150 is operatively coupled to CAM data sub-module 144 and CAS data collection sub-module 142 so that data can be transmitted between all three. CASM DB server 150 is capable of being a central repository for all CASM data. CASM DB server is capable of being used as a storage/retrieval DB for other CASM components (e.g., CAS data collection sub-module 142).

CAM display sub-module 146 includes computer programs capable of receiving requests for a display of communication data and interoperability of a geographic area, retrieving communication data and interoperability information and transmitting data and interoperability information in a display format. In one embodiment, CAM display sub-module 146 uses CAM data sub-module 144 to obtain system data for a displayed region. In one embodiment, CAM display sub-module 146 uses data to calculate interoperability data for a selected region and formats the data to be displayed on a map obtained from map generator sub-module 148. In one embodiment, CAM display sub-module 146 allows a user to select all of the applicable data for a region or to select a subset of the data based upon display requirements.

FIG. 1B is a block diagram of one embodiment of a communication assets survey and mapping tool. FIG. 1B is substantially similar to FIG. 1A, and thus, similar components are not described herein below. As shown in FIG. 1B, CASM tool system 102 includes at least one computer 110, internet 120 and system server 130, which hosts CASM tool module 140. CASM tool module 140 includes CAS data collection sub-module 142, CAM data sub-module 144, map generator sub-module 148 and CASM DB server 150. At least one computer 110 is operatively coupled to internet 120 so data can be transmitted between at least one computer 110 and internet 120. CAM display sub-module 146 is operatively coupled and resides on at least one computer 110.

Figure 1C:
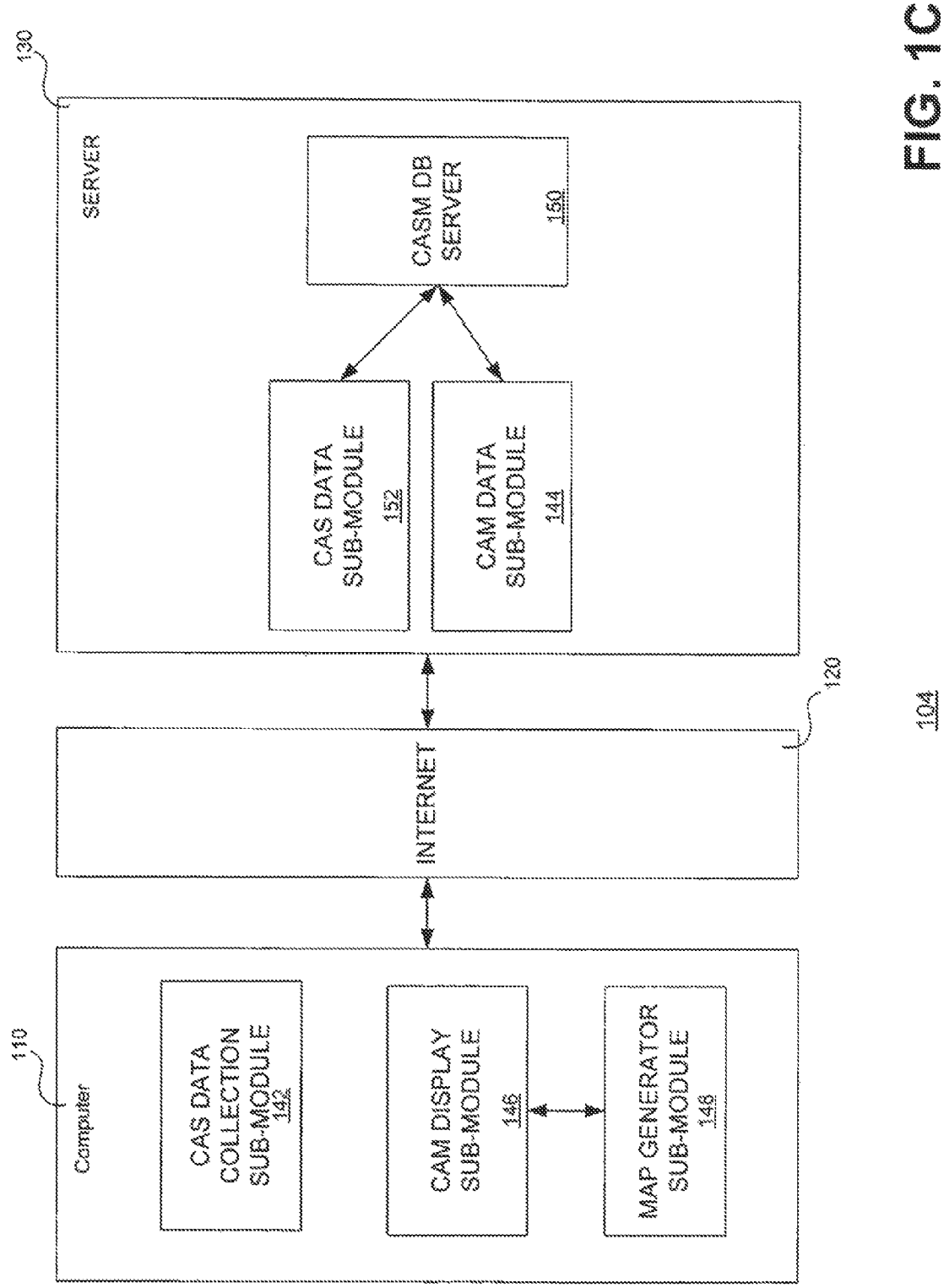
FIG. 1C is a block diagram of one embodiment of a communication assets survey and mapping tool.

FIG. 1C is a block diagram of one embodiment of a communication assets survey and mapping tool. FIG. 1C is substantially similar to FIG. 1A, and thus, similar components are not described herein below. As shown in FIG. 1C, CASM tool system 104 includes at least one computer 110, internet 120, system server 130, CAS data collection sub-module 142, CAM data sub-module 144, CAM display sub-module 146, map generator sub-module 148, CASM DB server 150 and CAS data sub-module 152. System server 130 hosts CAM data sub-module 144, CASM DB server 150 and CAS data sub-module 152. CAS data sub-module 152 is capable of interfacing between CAS data collection sub-module 142 and CASM DB server 150. At least one computer 110 hosts CAS data collection sub-module 142, CAM display sub-module 146 and map generator sub-module 148.

Figure 2:
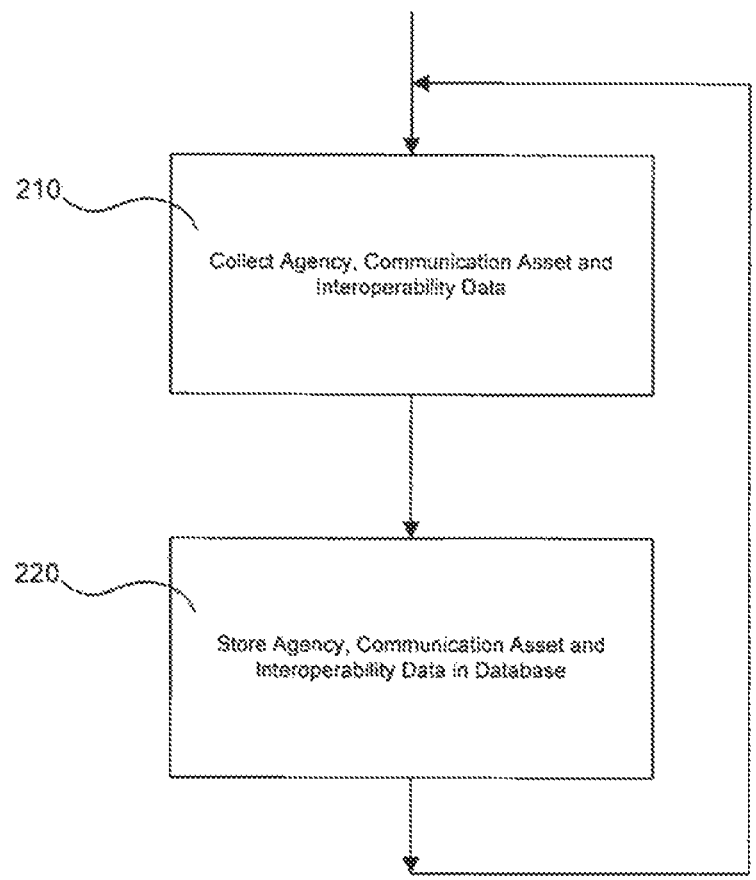
FIG. 2 is a flowchart of one embodiment of a method of a communication assets survey and mapping tool.

FIG. 2 is a flowchart of one embodiment of a method of a communication assets survey and mapping tool. Flowchart 200 of FIG. 2 is one embodiment of a method of CAS data collection sub-module 142 of FIG. 1A referred to as a CAS data collection sub-module method. Referring to FIG. 2, at BOX 210 of flowchart 200, the method collects agency, communication asset and interoperability data. In one embodiment, the method performs BOX 210 using software. After BOX 210, the method of flowchart 200 of FIG. 2 proceeds to BOX 220. At BOX 220 of flowchart 200, the method stores agency, communication asset, and interoperability data in a database. In one embodiment, the method performs BOX 220 using software. After BOX 220, the method of flowchart 200 of FIG. 2 returns to BOX 210.

Figure 3:
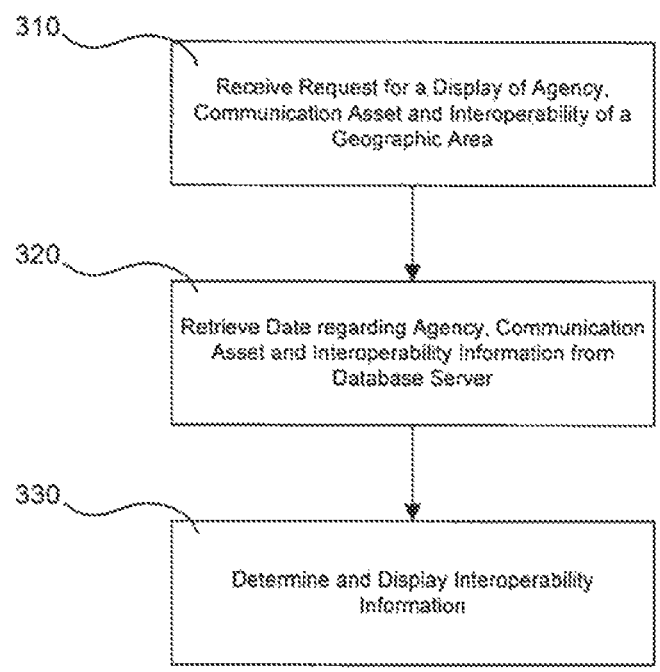
FIG. 3 is a flowchart of one embodiment of a method of a communication assets survey and mapping tool.

FIG. 3 is a flowchart of one embodiment of a method of a communication assets survey and mapping tool. Flowchart 300 of FIG. 3 is one embodiment of a method of CAM data sub-module 144 of FIG. 1A referred to as CAM display sub-module method. Referring to FIG. 3, at BOX 310 of flowchart 300, the method receives a request for a display of agency, communication asset and interoperability of a geographic area. In one embodiment, the method performs BOX 310 using software. After BOX 310, the method of flowchart 300 of FIG. 3 proceeds to BOX 320. At BOX 320 of flowchart 300, the method retrieves data regarding agency, communication asset and interoperability information from the database (e.g., CASM database server 150). In one embodiment, the method performs BOX 320 using software. After BOX 320, the method of flowchart 300 of FIG. 3 proceeds to BOX 330. At BOX 330 of flowchart 300, the method determines and displays interoperability information. In one embodiment, the method performs BOX 330 using software. In one embodiment, the method performs BOX 330 by determining interoperability between agencies based on their communication assets data. The method of flowchart 300 of FIG. 3 terminates at BOX 330.

The following describes an exemplary operation of CASM tool system 100 of FIG. 1A. As shown in FIG. 1A, CASM tool module 140 includes CAS data collection sub-module 142 and CAM display sub-module 144. A first user (e.g., San Diego City Police Chief) accesses CAS data collection sub-module 142 via one of at least one computer 110. CASM data collection sub-module 142 and one of at least one computer 110 are operatively coupled via system server 130 and internet 120. In accordance with BOX 210 of FIG. 2, CASM data collection sub-module method 200 collects agency, communication asset and interoperability data from the first user. For example, the user inputs equipment type and frequency usage data through CAS data collection sub-module 142. In accordance with BOX 220 of FIG. 2, CASM data collection sub-module method 200 stores interoperability data in CASM database server 150.

A second user (e.g., San Diego City Fire Chief) accesses CAS data collection sub-module 142 via one of at least one computer 110. The second user inputs agency, communication asset, and interoperability data to CAS data collection sub-module 142 regarding the second user's communication assets. In accordance with BOX 210 of FIG. 2, CAS data collection sub-module method 200 collects agency, communication asset and interoperability data from the second user. In accordance with BOX 220 of FIG. 2, CASM data collection sub-module method 200 stores agency, communication asset and interoperability data in CASM database server 150.

If given access permission, a third user (e.g., Coast Guard Official) via one of at least one computer 110 accesses CAM display sub-module 146, which interfaces with CASM DB server 150 through CAM data sub-module 144. CAM data sub-module 144 and one of at least one computer 110 are operatively coupled via CAM display sub-module 146, system server 130 and internet 120. In accordance with BOX 310 of FIG. 3, CAM display sub-module method 300 receives a request from the third user for a display of interoperability of the San Diego geographic area. In accordance with BOX 320 of FIG. 3, CAM display sub-module method 300 retrieves San Diego area information regarding agency, communication asset and interoperability data from CASM database server 150 through CAM data sub-module 144. In accordance with BOX 330 of FIG. 3, CAM display sub-module method 300 determines interoperability data and transmits interoperability information in a display format to the third user.

We claim:

1. A method for determining communications interoperability comprising the following steps:

a) collecting communication asset data that describes communication equipment used by emergency and first responders from local, state and federal entities in a geographical region;

b) determining the communications interoperability between the entities based on the collected communication asset data, wherein the communications interoperability describes the ability of the communication equipment used by emergency and first responders of a given entity to be interoperable or not interoperable with the communication equipment used by emergency and first responders in the other entities in the geographic region; and c) displaying the communications asset data and the communications interoperability of the entities in a geo-spatial referenced map to geographically-disparate users via an internet.

2. The method of claim 1, wherein the communication asset data further comprises the operating frequency of the communication equipment.

3. The method of claim 2, wherein the communication asset data further comprises the physical location of the communication equipment.

4. The method of claim 3, wherein the step of determining the communications interoperability between the entities comprises comparing communication frequencies used by emergency and first responders in each of the entities in the geographic region.

5. The method of claim 4, wherein step (c) is only performed for users that have been granted access permission.

6. The method of claim 5, wherein the communication asset data further comprises a tactical interoperable communications plan (TICP) from at least one of the entities.

7. A method of using a communication assets survey and mapping tool comprising:
   a) collecting agency data that identifies local, state, and federal entities in a geographic region;
   b) collecting communications asset data that identifies the communication equipment used by emergency and first responders in each of the entities in the geographic region;
   c) calculating interoperability data for the geographic region based upon the collected communication asset data, wherein the interoperability data describes the ability, or lack thereof, of the communication equipment used by emergency and first responders of a given entity to communicate with the communication equipment used by emergency and first responders in the other entities in the geographic region;
   d) storing the agency data, the communication asset data, and the interoperability data in a computer database;
   e) receiving a request from a user to display the agency data, the communication asset data, and the interoperability data for the geographic region; and
   f) displaying the agency data, the communication asset data, and the interoperability data for the geographic region to the user on a geo-spatial referenced map.

8. The method of claim 7, wherein step (c) is performed by a computer.

9. The method of claim 7, wherein the communication asset data further comprises the location of the communication equipment for each of the entities.

10. The method of claim 7, wherein the communication asset data consists of information regarding equipment type and frequency usage data of the communications equipment used by emergency and first responders in each of the entities in the geographic region.

11. The method of claim 7, wherein the communication asset data comprises communication frequencies used by emergency and first responders in each of the entities in the geographic region.

12. The method of claim 11, wherein the communication asset data further comprises a tactical interoperable communications plan, if available, from each entity in the region.

13. The method of claim 7, wherein step (f) is only performed if the user has been granted permission to access the communications asset data and the interoperability data.

14. The method of claim 13, wherein the user is geographically-disparate from the computer data base and steps (e) and (f) are performed over an internet.

15. A method for determining emergency communications interoperability between entities in a geographic region comprising the following steps:
   a) collecting agency identification data from first and second users from first and second entities respectively in the geographic region;
   b) collecting communications asset data that identifies the communication equipment used by emergency and first responders from the first and second entities;
   c) calculating communications interoperability data between the first and second entities based upon the collected communication asset data, wherein the communications interoperability data identifies whether or not the emergency and first responders of the first entity can communicate with the emergency and first responders of the second entity;
   d) storing the agency identification data, the communication asset data, and the communications interoperability data in a computer database;
   e) receiving a request from a third user that is not affiliated with either the first or the second entity to display the agency identification data, the communication asset data, and the communications interoperability data for the first and second entities; and
   f) displaying the agency identification data, the communication asset data, and the communications interoperability data for the first and second entities to the third user on a geo-spatial referenced map.

16. The method of claim 15, wherein the communication asset data further comprises the location of the communication equipment.

17. The method of claim 16, wherein the communication asset data further comprises communication frequencies used by emergency and first responders from the first and second entities.

18. The method of claim 17, wherein the communication asset data further comprises tactical interoperable communications plans from each of the first and second entities.

19. The method of claim 18, wherein step (f) is only performed if the third user has been granted permission to access the communications asset data and the interoperability data.

20. The method of claim 19, wherein steps (e) and (f) are performed over an internet.

* * * * *